United States Patent [19]

Goto

[11] Patent Number: 5,492,103
[45] Date of Patent: Feb. 20, 1996

[54] AIR INTAKE SYSTEM FOR SUPERCHARGED ENGINE

[75] Inventor: Tsuyoshi Goto, Hiroshima, Japan

[73] Assignee: Mazda Motor Corporation, Hiroshima, Japan

[21] Appl. No.: 357,366

[22] Filed: Dec. 15, 1994

Related U.S. Application Data

[63] Continuation of Ser. No. 31,369, Mar. 15, 1993, abandoned.

[30] Foreign Application Priority Data

Mar. 16, 1992 [JP] Japan .................................... 4-058164
Mar. 16, 1992 [JP] Japan .................................... 4-058165

[51] Int. Cl.$^6$ .......................... F02B 29/04; F02B 33/00
[52] U.S. Cl. ........................................... 123/564; 123/563
[58] Field of Search .................................. 123/564, 563; 60/599

[56] References Cited

U.S. PATENT DOCUMENTS 4,738,110  4/1988  Tateno ..................................... 123/564
4,802,456  2/1989  Okane et al. ........................... 123/564
5,119,795  6/1992  Goto et al. .............................. 123/564

FOREIGN PATENT DOCUMENTS

3104124   9/1982  Germany ................................ 123/564
2-283816  11/1990 Japan .

*Primary Examiner*—Charles Freay
*Attorney, Agent, or Firm*—Keck, Mahin & Cate

[57] ABSTRACT

An intake system has a recirculation passage, through which supercharging air discharged from a supercharger is recirculated into the supercharger, and a recirculation control valve disposed in the recirculation passage, by which the recirculation passage is gradually opened and closed as the pressure of supercharging air downstream from the supercharger changes between a low specified pressure, below the atmospheric pressure, and a high specific pressure, above the atmospheric pressure. The air intake system further has a bypass passage, for allowing air to bypass an intercooler, which is opened and closed by a bypass control valve at an interim specified pressure between the high and low specified pressures.

6 Claims, 5 Drawing Sheets

AIR INTAKE SYSTEM FOR SUPERCHARGED ENGINE

This is a continuation of application Ser. No. 08/031,369, filed Mar. 15, 1993, now abandoned.

BACKGROUND OF THE INVENTION

1. Field of the Invention

This invention relates to an intake system for a supercharged engine in which a supercharger and an intercooler are disposed in an air intake passage and, more particularly, to an intake system, for a supercharged engine, which is provided with a recirculation path and a recirculation control valve for recirculating supercharging air when the engine is operating under low engine loads.

2. Description of the Related Art

An air intake system is known in which a mechanical supercharger, driven by the engine output shaft, is provided, along with a recirculation control valve and a relief path, in an air intake path so as to allow supercharging air to be recirculated under low load engine operating conditions. Such a control system is known from, for instance, Japanese Unexamined Patent Publication No. 2-283816.

The layout of the intake system described in this publication disposes a mechanical supercharger downstream from a throttle valve of an air intake path or passage and an intercooler downstream from the supercharger for cooling supercharging air. A recirculation path or passage, i.e. a supercharging air bypass passage, is provided between the supercharger and the intercooler, in which path there is provided a recirculation control valve. The recirculation control valve, which is directly connected with and operated by a pressure controlled actuator, into which pressure downstream from the throttle valve is introduced, opens the recirculation passage in a low engine load range in which the pressure downstream from the throttle valve is lower and closes it when the pressure downstream from the throttle valve increases with an increase in engine load.

With this type of an intake system of a supercharged engine, an energy loss in the supercharger becomes larger with an increase in ratio between pressures upstream and downstream from the supercharger. Accordingly, in order to prevent such an energy loss, it is desirable to recirculate part of air released from the supercharger while the engine is supplied with a sufficient amount of air according to engine operating conditions in a range of certain high engine loads during operation of the supercharger. In addition, in order to maintain a linear relationship between throttle opening and engine output torque, the recirculation control valve is desired to gradually decrease its opening with a change in throttle opening in a specific range. For these reasons, the recirculation control valve of the publication mentioned above is designed and adapted to gradually close with an increase in boost pressure downstream from the supercharger. However, if the recirculation control valve simply closes gradually with an increase in boost pressure, it causes hunting near engine operating conditions in which it fully closes due to a pressure drop caused by suspension of recirculation. As a result, the recirculation control valve is apt to be unstable in operation, and a range of engine operating conditions in which the recirculation control valve is fully closed is made unstable. In order to eliminate these adverse effects, it was thought to close rapidly the recirculation control valve when the recirculation control valve reaches a certain opening. However, such a rapid closing of the recirculation control valve causes torque shock.

Further, with this type of an intake system, when the recirculation control valve is open while the supercharger is operating, after the air being expelled from the supercharger passes through the intercooler, a necessary amount of the cooled air is delivered into combustion chambers of the engine, and an excess of the cooled air is recirculated to the upstream of the supercharger. As a consequence, in a range in which a small amount of air is taken, the air tends to be over-cooled, and the pressure of air between the supercharger and the intercooler is insufficiently lowered due to the resistance of air flow in the intercooler, resulting in a loss of energy.

In order to eliminate such energy loss, in addition to the provision of a recirculation passage communicating portions of the intake passage upstream and downstream from the supercharger, a bypass passage may be established downstream from the supercharger so as to allow discharged air to be delivered directly to the engine bypassing the intercooler when the engine operates under low engine loads. However, the provision of a bypass passage causes a requirement of controlling of air flowing through the recirculation passage in accordance with engine operating conditions so as to meet demands of engine output and fuel economy. In addition, in a range of low engine loads, in which a lesser amount of air is required, over-cooling must be prevented. On the other hand, in a range in which a relatively large amount of air is required while the recirculation passage is required to be open, a temperature increase caused by recirculation must be suppressed or controlled to be small. These requirements can not be satisfied by simply opening and closing of the bypass passage in the same manner as the recirculation passage.

SUMMARY OF THE INVENTION

It is an object of this invention to provided an air intake system for a supercharged engine which is equipped with a supercharger and an intercooler, in which the recirculation of air can be regulated in accordance with engine operating conditions so as to reduce energy loss of supercharging air discharged from the supercharger, and in which the temperature of the air can be regulated.

It is an object of this invention to provided an air intake system for a supercharged engine which is equipped with a supercharger, in which the amount of recirculated air can be regulated so as to control the engine output in accordance with engine operating conditions, thereby preventing an occurrence of torque shock and increasing the responsiveness in torque increase of the engine.

The foregoing objects of this invention are accomplished by providing an intake system, for a supercharged internal combustion engine, having a recirculation passage, for communicating portions of an intake passage upstream and downstream from a supercharger, through which supercharging air discharged from the supercharger is recirculated into the supercharger. The recirculation passage is opened and closed by a recirculation valve means disposed in the recirculation passage. As the pressure of supercharging air immediately downstream from the supercharger changes between a low specified pressure below the atmospheric pressure and a high specific pressure above the atmospheric pressure, the recirculation valve means is caused to increasingly open and decreasingly close the recirculation passage. The air intake system further has an intercooler disposed in the intake passage downstream from the supercharger and a bypass passage for communicating portions of the intake passage upstream and downstream from the intercooler so as to allow air to bypass the intercooler. A bypass control valve means is caused at an interim specified pressure of supercharging air pressure between the high and low specified pressures so as to open and close the bypass passage.

Specifically, the bypass control valve means is disposed in a joint passage portion through which the recirculation passage and the bypass passage are commonly communicated with the intake passage between the supercharger and the intercooler, and the recirculation valve means is disposed in the recirculation passage downstream from the joint passage portion.

The recirculation valve control means, including a pressure operated actuator, causes the recirculation valve means to open and close the recirculation passage in accordance with differences between the atmospheric pressure and an intake air pressure upstream of the supercharger.

Further, as discharging air pressure increases toward a high specified pressure, the recirculation valve control means causes the recirculation valve means to gradually close the recirculation passage so as to leave a small clearance in the recirculation passage which allows recirculation of a small amount of air downstream from the supercharger at a high specified pressure, and causes the recirculation valve means to close completely the recirculation passage at a pressures higher than the high specified pressure.

According to the intake system of this invention, in a low engine load range in which air intake is low in pressure, the recirculation valve means holds the recirculation passage open, so that an excess of supercharging air delivered from the supercharger is recirculated, and, since the bypass control valve means opens the bypass passage, supercharging air delivered into the engine is prevented from being overcooled. On the other hand, in a high engine load range in which the throttle valve is fully opening or nearly fully opening, the recirculation valve means and the bypass control valve means remain closed, so as to enhance supercharging of air and cooling of the supercharging air. In the interim range between the high and low engine load ranges, in accompaniment with an pressure increase in intake air, the recirculation valve means gradually closes. However, even until the recirculation valve means reaches its closed position, in a range in which the quantity of intake air may be considerable and, thereby, in which a large increase in temperature of the intake air due to recirculation, the bypass control valve means is closed, so as to enhance cooling of intake air by the intercooler.

Until the pressure downstream from the supercharger reaches the high specified pressure, the amount of recirculating air is desirably regulated from the highest to the lowest according to engine operating conditions. On the other hand, since, in a range of engine operating conditions in which the pressure downstream from the supercharger exceeds the high specified pressure, the recirculation of air is completely stopped, so as to increase the pressure of intake air delivered into the engine. The speed of increase in engine output torque, which is caused by the prevention of recirculation of intake air, is varied according to engine operating conditions, or according to whether acceleration is gentle or rapid.

BRIEF DESCRIPTION OF THE DRAWINGS

The above and other objects and features of the present invention will be clearly understood from the following detailed description with respect to preferred embodiments thereof when considered in conjunction with the accompanying drawings, in which.

DETAILED DESCRIPTION OF THE PREFERRED EMBODIMENT

Because intake systems are well known, the present description will be directed in particular to elements forming part of, or cooperating directly with, an intake system for a supercharged engine in accordance with the present invention. It is to be understood that parts or elements not specifically shown or described can take various forms well known to those skilled in the automobile art.

Figure 1:
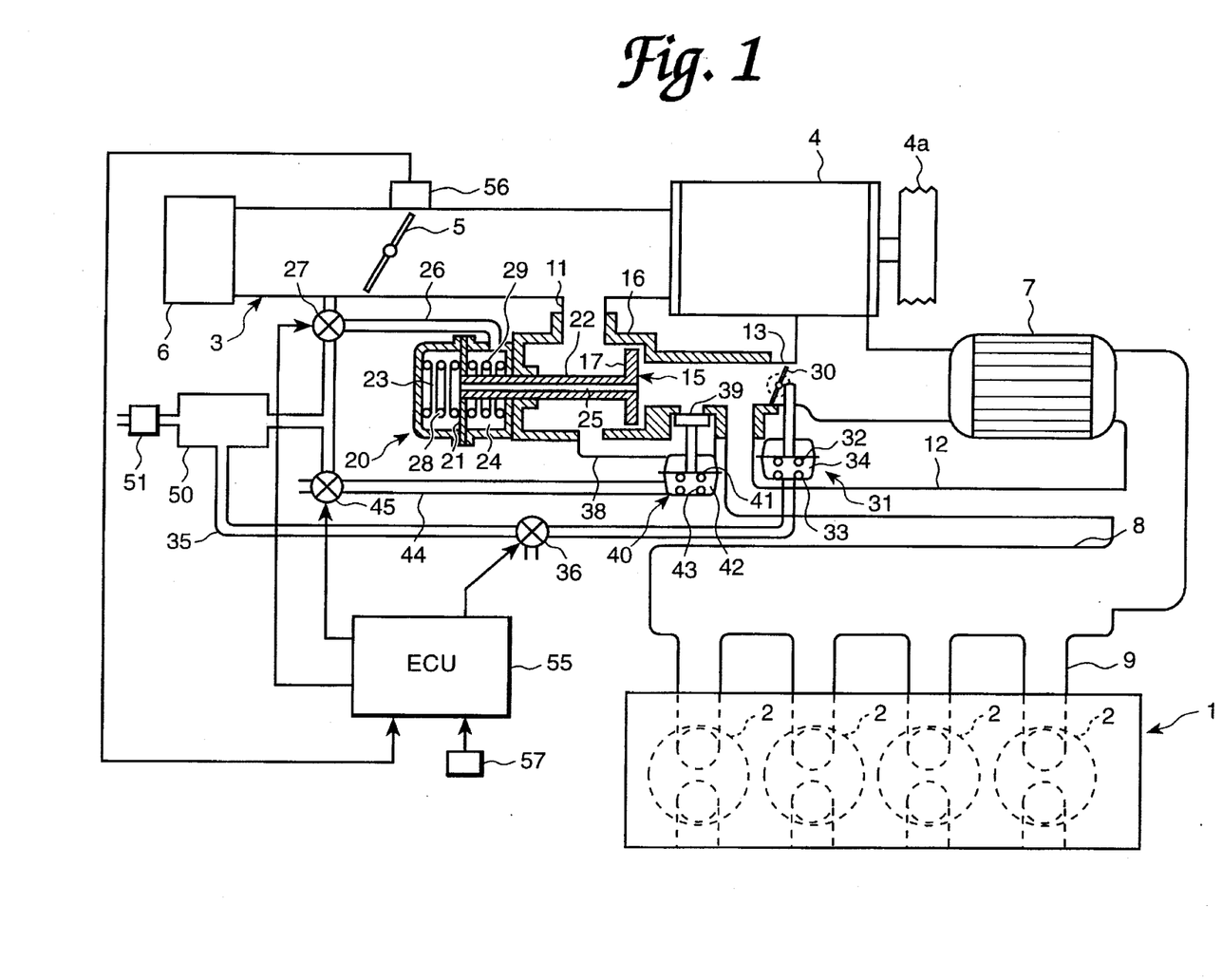
FIG. 1 is a schematic illustration showing an intake system in accordance with a preferred embodiment of the present invention.

Referring to FIG. 1, schematically illustrating the overall construction of an air intake system cooperating with a supercharged engine in accordance with a preferred embodiment of this invention, an in-line multi-cylinder internal combustion engine 1 has a plurality of, for instance, four cylinders 2. The engine 1 is provided with an air intake passage 3 in which a supercharger 4, such as a Lysholm type mechanical supercharger, is provided to supply supercharging air to the engine 1. The supercharger 4 is operationally coupled to an engine by means of a belt (not shown) provided between a pulley 4a of the supercharger 4 and an engine output shaft, such as a crankshaft. The engine is provided with an intake valve (not shown) in an intake port of each cylinder 2. This intake valve is adapted to retard closing thereof much later than that of ordinary engines. This substantially reduces pumping loss under low engine load conditions, while it provides an increase in charging efficiency under high engine load conditions which attributes to cooling and supercharging of air and retarded close of the intake valve.

Upstream from the supercharger 4, there is provided, in the intake passage 3, a throttle valve 5, the opening of which is regulated in response to depressed stroke of the accelerator pedal. The intake passage 3 is further provided with an air cleaner 6 in its upstream portion and an intercooler 7 located downstream from the supercharger 4 for cooling supercharging air. The intake passage 3 is formed with a surge tank 8 downstream from the intercooler 7. Individual intake passages 9 communicate the surge tank 8 with the respective intake ports of the cylinders 2 of the engine 1.

The air intake passage 3 is provided with a recirculation passage 11, which communicates downstream and upstream portions of the intake passage 3 with respect to the supercharger 4, and an intercooler bypass passage 12 so as to bypass the intercooler 7. Specifically, a joint passage 13, which is common to the inlet end of the recirculation passage 11 and the upstream end of the intercooler bypass passage 12, is jointly connected to the intake passage 3 between the supercharger 4 and the intercooler 7. The recirculation passage 11 branches off from the joint passage 13 and its outlet end of the recirculation passage 11 extends to the upstream portion of the intake passage 3 from the supercharger 4. On the other hand, the intercooler bypass passage 12 branches off from the joint passage 13 and its downstream portion extends to the intake passage 3 downstream from the intercooler 7. The recirculation passage 11 and the intercooler bypass passage 12 are provided with a recirculation control valve 15 and a bypass control valve 30, respectively. Specifically in this embodiment, the bypass control valve 30 is disposed in the joint passage 13, which is the upstream portion of the intercooler bypass passage 12. On the other hand, the recirculation control valve 15 is disposed in the recirculation passage 11 between the portion where the recirculation passage 11 branches off from the joint passage 13 and the portion upstream from the supercharger 4.

Figure 2:
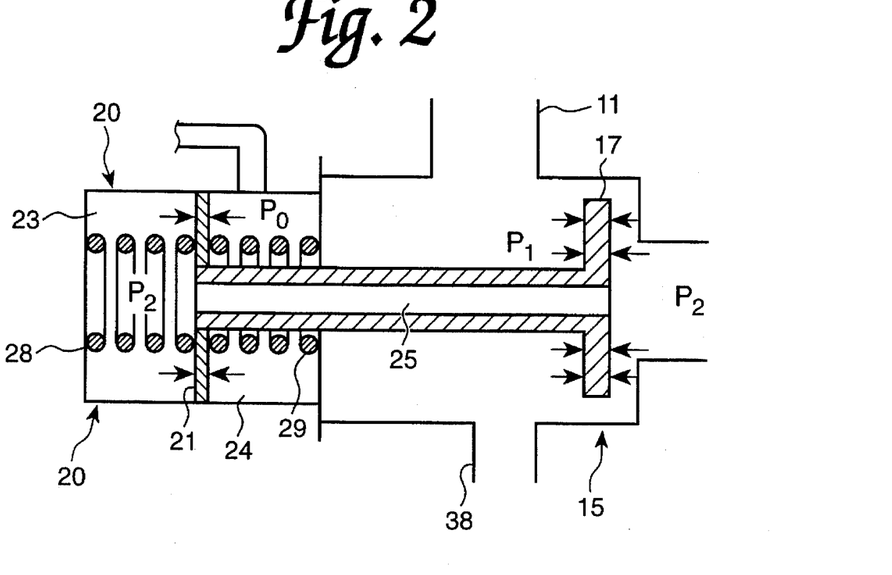
FIG. 2 is a detailed illustration showing a recirculation control valve of the intake air system shown in FIG. 1.

The recirculation control valve 15 is designed and adapted to be operated by means of a diaphragm actuator 20 in response to the intake air pressure downstream from the supercharger 4. Specifically, as shown in FIGS. 1 and 2, the recirculation control valve 15 has a valve body 17 provided within a valve housing 16 disposed in the recirculation passage 11. The valve body 17 is linked to a diaphragm 21 of the actuator 20 by means of a connecting rod 22. Air pressure $P_2$ on the downstream side of the supercharger 4 acts on the valve body 17 on its one side so as to open it. On the other hand, air pressure $P_1$ developed between the supercharger 4 and the throttle valve 5 acts on the valve body 17 on the other side. Thus, the housing 16 and the diaphragm actuator 20 constitute an operational control means for the recirculation control valve 15.

The diaphragm actuator 20 is interposed between a primary pressure chamber 23 located on one side of the diaphragm 21 and a secondary pressure chamber 24 located on the opposite side of the diaphragm 21 so as to provide a pressure acting on the diaphragm 21 required to close the valve body 17. Air pressure $P_2$ developed downstream from the supercharger 4 is introduced into the primary pressure chamber 23 through a pressure guide passage 25 which is formed within the connecting rod 22. In addition, air pressure $P_0$ developed upstream from the throttle valve 5, which is substantially equal to the atmospheric pressure, is introduced into the secondary pressure chamber 24 through a pressure guide passage 26. The pressure guide path 26 is selectively communicated with the intake passage 3 downstream from the throttle valve 5 and a vacuum tank 50 by means of an electromagnetic three-way valve 27 so that, ordinarily, the air pressure $P_0$, i.e. the atmospheric pressure, upstream from the throttle valve 5 is introduced into the secondary pressure chamber 24. However when the valve body 17 is forcibly closed, a negative pressure is introduced into the secondary pressure chamber 24. In the pressure chambers 23 and 24, there are provided springs 28 and 29 so as to press the diaphragm 21 from both sides. It is to be noted that the diaphragm 21 and the valve body 17 have the same area of pressure receiving surfaces. The bypass control valve 30 is coupled with an actuator 31. This actuator 31 has a diaphragm 32 which is linked to the bypass control valve 30, a spring 33 which urges the diaphragm 32 so as to close the bypass control valve 30, and a pressure chamber 34 located on one side of the diaphragm 32. Negative pressure from the vacuum tank 50 and the atmospheric pressure are selectively introduced into the pressure chamber 34 through a pressure guide passage 35 via an electromagnetic three-way valve 36 so that, when negative pressure is introduced, the bypass control valve 30 is opened and, when the atmospheric pressure is introduced, it is closed.

In further association with the intake passage 3, in order to relieve an excessive increase in supercharging pressure, there are provided a relief assist passage 38 which bypasses the valve body 17 of the recirculation control valve 15, a relief valve 39 for opening and closing the relief assist passage 38, and an actuator 40 for actuating the relief valve 39. The actuator 40 has a diaphragm 41 coupled to the relief valve 39, a pressure chamber 42 positioned on one side of the diaphragm 41 and a spring 43 located within the pressure chamber 42 so as to urge the diaphragm 41. The pressure chamber 42 is selectively communicated with the intake passage 3 upstream from the throttle valve 5 and the vacuum tank 50 through a pressure guide passage 44 and an electromagnetic three-way valve 45. Ordinarily, pressure within the intake passage 3 upstream from the throttle valve 5 is maintained so as to be introduced into the pressure chamber 42. On the other hand, when the relief valve 39 is acted on by a pressure downstream from the supercharger 4, increased in excess above a critical level determined by the spring 43, it is opened. Otherwise, if negative pressure is introduced into the pressure chamber 42, the relief valve 39 is also opened, or it may be forcibly opened as required. The vacuum tank 50 is coupled to either the intake passage downstream from the throttle valve 5 or a negative pressure source (not shown), such as a vacuum pump.

All of the electromagnetic three-way valves 27, 36 and 45 are controlled by means of an electronic control unit (ECU) 55. The ECU 55 receives a signal representative of the opening of the throttle valve 5 from a throttle opening sensor 56 and a signal representative of the rotational speed of engine from speed sensors 57. In accordance with engine operating conditions represented by the signals, the ECU 55 controls selectively opening and closing of the electromagnetic three-way valves 27, 36 and 45, thereby controlling the actions of valves 15, 30 and 39.

Referring to FIG. 2, explaining the action of the recirculation control valve 15 in accordance with pressures acting on the valve body 17 and the diaphragm 21 of the actuator 20, respectively, a pressure $P_2$ developed in the intake passage 3 downstream from the supercharger 4 acts on the valve 17 from its one side, and, at the same time, is introduced into the primary pressure chamber 23 of the actuator 20 so as to act on the diaphragm 21. These pressures are mutually canceled. In addition, a set of the springs 28 and 29 urge the diaphragm 21 from its opposite sides. The springs 28 and 29 are designed and adapted so that, when being balanced, they hold the valve 17 in its almost entirely closed position with a slight clearance δ of, for instance, approximately 0.5 mm from the valve seat 15a. In the operation of the recirculation control valve 15 cooperating with the actuator 20, when pressure $P_0$ developed in the intake passage 3 upstream from the throttle valve 5 is led into the secondary pressure chamber 24 of the actuator 20, the positional displacement x of the valve body 17 from the closed position where the springs 28 and 29 are balanced is expressed as follows:

$$(P_0 - P_1)S = kx$$

where
    $P_1$ is the pressure downstream from the throttle valve 5 acting directly on the valve body 17 so as to close it;

$P_0$ is the pressure upstream from the throttle valve 5 acting on the diaphragm 21 so as to open the valve body 17;

S is the pressure receiving areas of the diaphragm 21 and the valve body 17; and k is the spring constant of the springs 28 and 29.

In this expression, since S and k are constant, the valve body 17 changes its position according to the pressure difference $(P_0-P_1)$ between the pressures $P_1$ and pressure $P_0$, respectively, downstream and upstream from the throttle valve 5. When the pressure difference $(P_0-P_1)$ exceeds a specified value, then the positional displacement of the valve body 17 exceeds a full-opening displacement, which is referred to a displacement at which the valve body 17 provides substantially the same surface areas on its opposite sides to the pressure $P_1$ and $P_2$, the recirculation control valve 15 is entirely opened.

Figure 3:
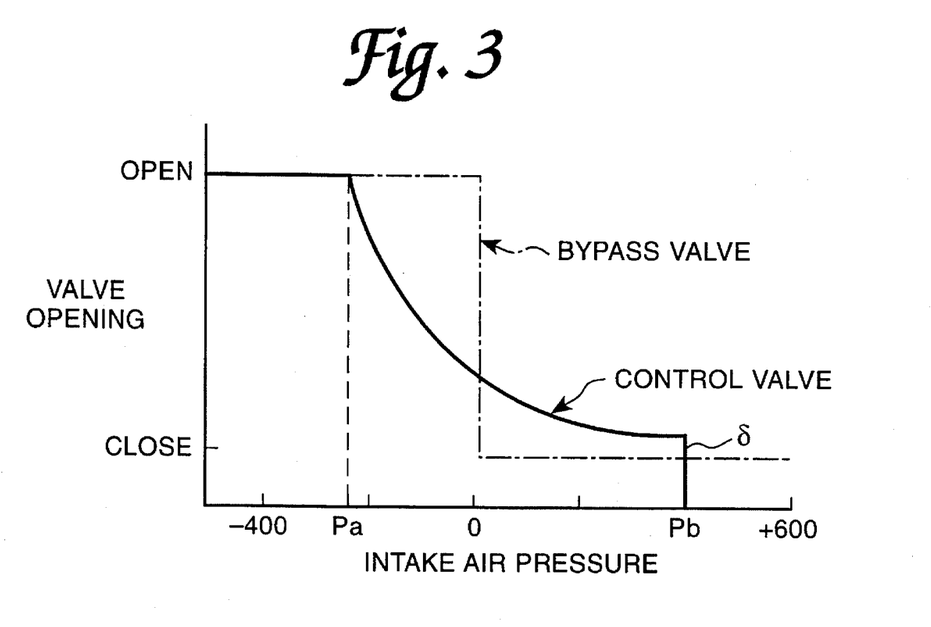
FIG. 3 is a diagram showing the relationship between openings of the recirculation control valve and a bypass control valve.

The spring constant k of the springs 28 and 29 is established so as to keep the valve opening characteristics of the recirculation control valve 15 shown in FIG. 3.

Referring to FIG. 3 showing the relationship between valve openings of the recirculation control valve 15 and the bypass control valve 30 and intake air pressure, or boost pressure, downstream from the supercharger 4, in a low load range in which boost pressure is low, the pressure $P_1$ downstream from the throttle valve 5 is low, providing a great pressure difference $(P_0-P_1)$ and, in a high load range in which boost pressure is high, the pressure $P_1$ downstream from the throttle valve 5 is close to the atmospheric pressure, decreasing the pressure difference $(P_0-P_1)$. Consequently, the recirculation control valve 15 changes the valve body 17 in position in accordance with pressure differences, so that it entirely opens the valve body 17 in the low load range in which the boost pressure is low and the pressure difference is large, as shown by a solid line in FIG. 3. However, with greater drop from a critical boost pressure $P_a$ lower than the atmospheric pressure, the valve opening of the recirculation control valve 15 decreases. At a boost pressure equal to the atmospheric pressure, the recirculation control valve 15 is held open to some extent. When the boost pressure increases greatly beyond the atmospheric pressure, the recirculation control valve 15 is almost entirely closed.

The valve opening characteristics of the recirculation control valve 15 from the entirely closed position to the entirely open position is controlled by a mechanical control means including the actuator 20. In order to assure that the recirculation control valve 15 is entirely closed under severely high loads in the high load range in which the boost pressure exceeds a critical high pressure $P_b$, the ECU 55 causes the electromagnetic three-way valve 27 to switch so as to introduce a negative pressure into the secondary pressure chamber 24 of the actuator 20 from the vacuum tank 50, thereby forcibly closing the recirculation control valve 15 to its entirely closed position.

On the one hand, even while the recirculation control valve 15 has not yet been entirely closed, the bypass control valve 30 is closed when the boost pressure reaches and decreases beyond the atmospheric pressure, as shown by a dotted line in FIG. 3. The open and close operation of the bypass control valve 30 is performed by controlling the electromagnetic three-way valve 36 by the ECU 55. That is, when the ECU 55 monitors the engine operating condition under which the boost pressure reaches the atmospheric pressure, it switches the three-way electromagnetic valve 36.

Figure 4:
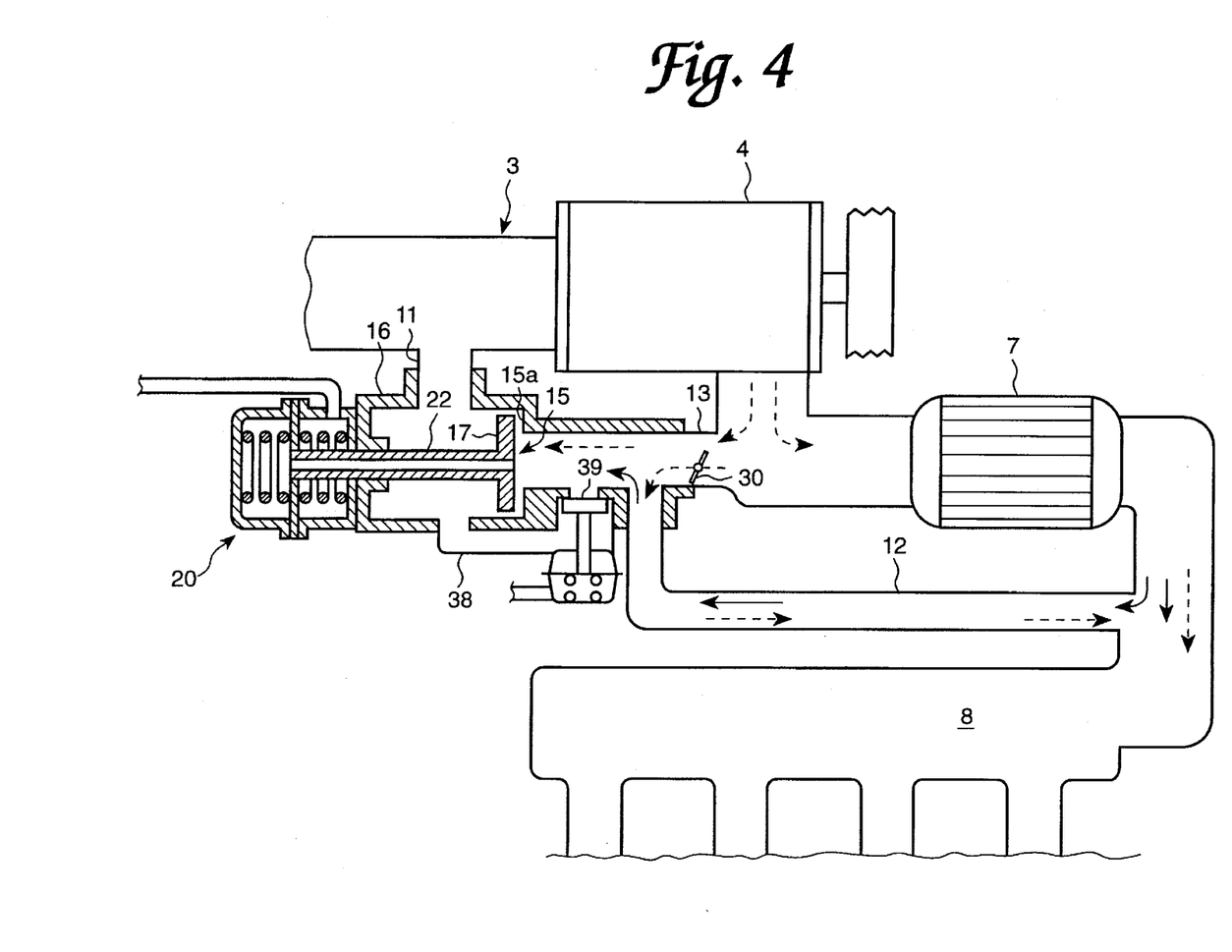
FIG. 4 is a schematic illustration showing air flow in a recirculation passage and a bypass passage.

The operation of the air intake system depicted in FIGS. 1 and 2 will be best understood from the following description with reference to FIG. 4. In the low load range in which the throttle valve 5 is nearly entirely closed or entirely closed, both recirculation control valve 15 and bypass control valve 30 are opened, so as to allow air passed through the supercharger 4 to flow into the intercooler 7, the intercooler bypass passage 12 and the recirculation passage 11, as shown by a broken lined arrow in FIG. 4. In other words, while part of the air introduced into the engine passes through intercooler 7, the remainder passes through the intercooler bypass passage 12 and is consequently prevented from being over cooled. On the other hand, an excess of air passes through the recirculation passage 11 directly from the supercharger 4 and returns into the intake passage 3 upstream from the supercharger 4. This circulation of intake air lowers the pressure ratio between upstream and downstream from the supercharger 4, so as to reduce energy loss by the supercharger 4.

When the throttle valve 5 is gradually opened, after reaching the critical boost pressure $P_b$ lower than the atmospheric pressure, the recirculation control valve 15 gradually decreases its valve opening. Such gradual changing of valve opening of the recirculation control valve 15 causes a linear change in engine output torque responding to changes in opening of the throttle valve 5, so as to avoid a sudden change in engine output torque. In addition, even in a supercharging range of engine operating conditions in which the boost pressure exceeds the atmospheric pressure, the recirculation control valve 15 is not entirely closed until the boost pressure is under a certain pressure, so that supercharging air is appropriately recirculated, with a measurable reduction in energy loss by the supercharger 4.

The bypass control valve 30 is switched to close in the range of engine operating conditions in which the boost pressure equals to the atmospheric pressure, and, even if the recirculation control valve 15 has not entirely closed, it is also closed in a range of engine operating conditions in which intake air is increased to some extent. In this state, as shown by a solid arrow in FIG. 4, air discharged from supercharger 4 passes through the intercooler 7, and, thereafter, a necessary amount of it is directed to the combustion chambers of the cylinders 2. At the same time, an excess of air passes through the bypass passage 12 downstream from the intercooler 7 and, thereafter, the recirculation passage 11 so as to be recirculated to the intake passage 3 upstream from the supercharger 4. Thus, an increase in temperature of intake air and supercharging air, which is directed to the engine 1, is controlled to be low. That is, in such a range of engine operating conditions, although the temperature of intake air is easily increased through recirculation, air actually supplied to and taken into the engine 1 is sufficiently cooled by the intercooler 7, so as to avoid an increase in temperature of intake air accompanying a reduction in supercharging efficiency. Furthermore, since the intake air which is recirculated into the intake passage 3 upstream from the supercharger 4 has been cooled through the intercooler 7, it cools the supercharger 4.

In a specific range of supercharging in which boost pressure is significantly high, the recirculation control valve 15 is almost entirely closed or completely closed, and the bypass control valve 30 is held closed. In this state, along with an enhancement of supercharging action of the supercharger 4, an increase in supercharging efficiency is obtained as a result of the cooled intake air.

Although switching of the recirculation control valve 15 from the entirely closed position to the entirely open position, characterized as shown in FIG. 3, is simply and accurately accomplished by the mechanical control means described above and shown in FIGS. 1 and 2, it may be accomplished by means of electric control, such as duty control as will be described later. In addition, the recirculation passage 11 and the bypass passage 12 may be separately provided from each other. In this instance, the recirculation passage 11 is provided so as to communicate the portions of the intake passage 3 upstream and downstream from the supercharger 4. The bypass passage 12 is provided to bypass the intercooler 7 downstream from the recirculation passage 11. Even in this arrangement, the recirculation control valve 15 and the bypass control valve 30 are controlled to open and close in accordance with engine operating conditions as shown in FIG. 3. This arrangement also results in effectively preventing intake air from being overcooled in a range of low engine loads in which the recirculation control valve and the bypass valve are open and in providing effectively supercharging and cooling intake air in a range of high engine loads. In addition, even if the recirculation control valve is not entirely closed, the bypass control valve is closed in a range in which the amount of intake air is relatively considerable, so that the intake air being delivered to the engine is appropriately cooled.

Figure 5:
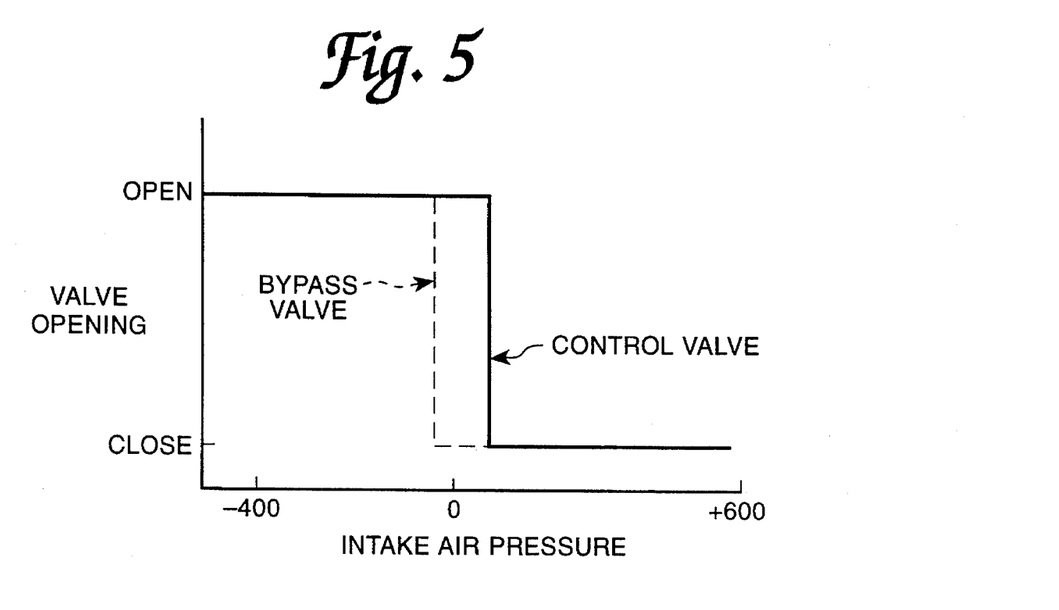
FIG. 5 is a diagram showing another relationship between openings of the recirculation control valve and a bypass control valve.

In order to provide linear changes in engine torque, it is desirable to gradually change the opening of the recirculation control valve 15 in the specific range of boost pressure as shown in FIG. 3. However the recirculation control valve 15 may be switched at a specific boost pressure as shown in FIG. 5. In this instance, in addition to arranging of the passages to be the same as shown in FIG. 1, the specific boost pressure at which the recirculation control valve is switched is established higher than a boost pressure at which the bypass control is switched so as to open the bypass control valve at lower engine loads in the range of engine loads in which the recirculation control valve is opened and close it at higher engine loads in the range of engine loads in which the recirculation control valve is opened and at higher engine loads in the range of engine loads in which the recirculation control valve is closed. This modification also accompanies the same effective functions as those obtained in the previous embodiment, such as the prevention of over-cooling and energy loss at lower engine loads, i.e. under smaller amounts of intake air, in a range of engine loads in which the recirculation control valve is held opened, the prevention of increasing of the temperature of intake air under relatively larger amounts of intake air in a range of engine loads in which the recirculation control valve is held opened, the sufficient supercharging and cooling of intake air in a range of higher engine loads in which the recirculation control valve is held closed.

Figure 6:
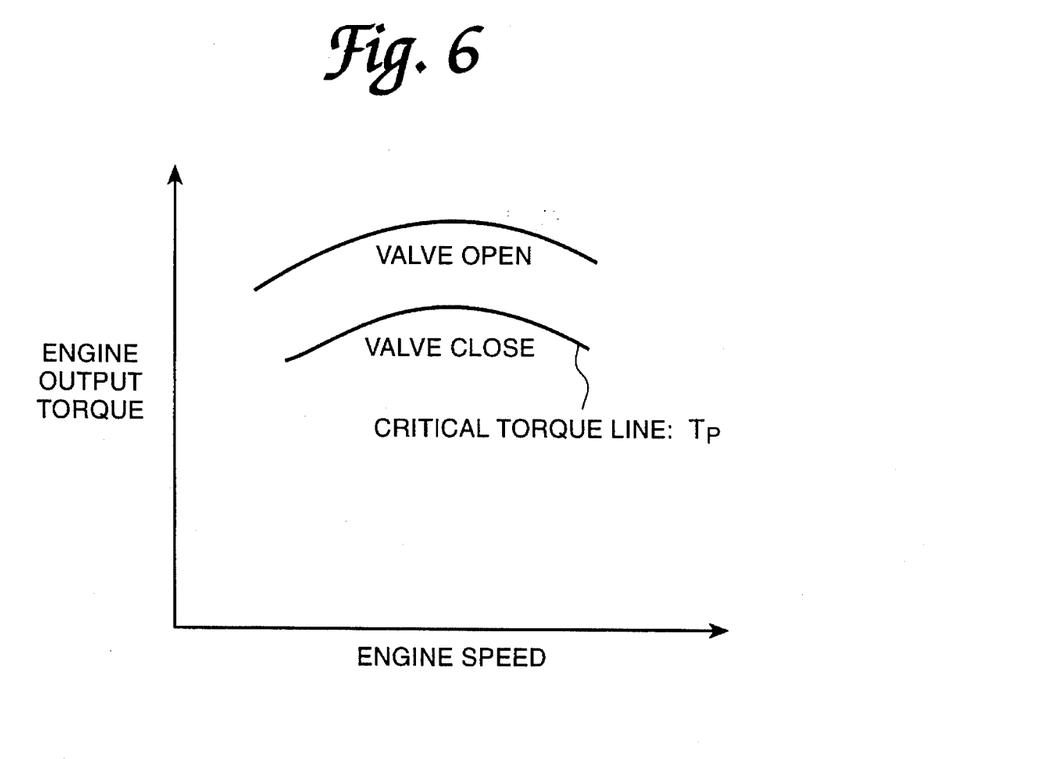
FIG. 6 is a diagram showing zones of operation of a three-way electromagnetic valve.

As was previously described, the valve opening of the recirculation control valve 15 may be accomplished by means of electric control. As described above, when the pressure $P_0$ developed in the intake passage 3 upstream from the throttle valve 5 is led into the secondary pressure chamber 24 of the actuator 20, there is a slight clearance $\delta$ between the valve body 17 and the valve seat 15a even the recirculation control valve 15 is nearly completely closed. In the high load range of engine operating conditions in which the boost pressure becomes higher than a critical boost pressure $P_b$, the electromagnetic three-way valve 27 is duty controlled by the ECU 55 so as to introduce a negative pressure into the secondary pressure chamber 24 of the actuator 20. As a result, the pressure forcing the valve body 15 to be closed is increased, so as to completely close the valve body 15. That is, as shown in FIG. 6, in a low load range of engine operating conditions which is defined under a critical torque line $T_p$ which correspondingly indicate the critical pressure $P_b$ with respect to engine speeds, the electromagnetic three-way valve 27 is held deenergized or turned off. On the other hand, in a high load range of engine operating conditions which is defined above the critical torque line $T_p$, the electromagnetic three-way valve 27 is held energized or turned on.

The ECU 55 controls the duty of the electromagnetic three-way valve 27 so as, on one hand, to gradually bring the recirculation control valve 15 into its entirely closed position when the engine operating condition changes gradually and, on the other hand, to rapidly bring the recirculation control valve 15 into its entirely closed position when the engine operating condition changes rapidly.

Figure 7:
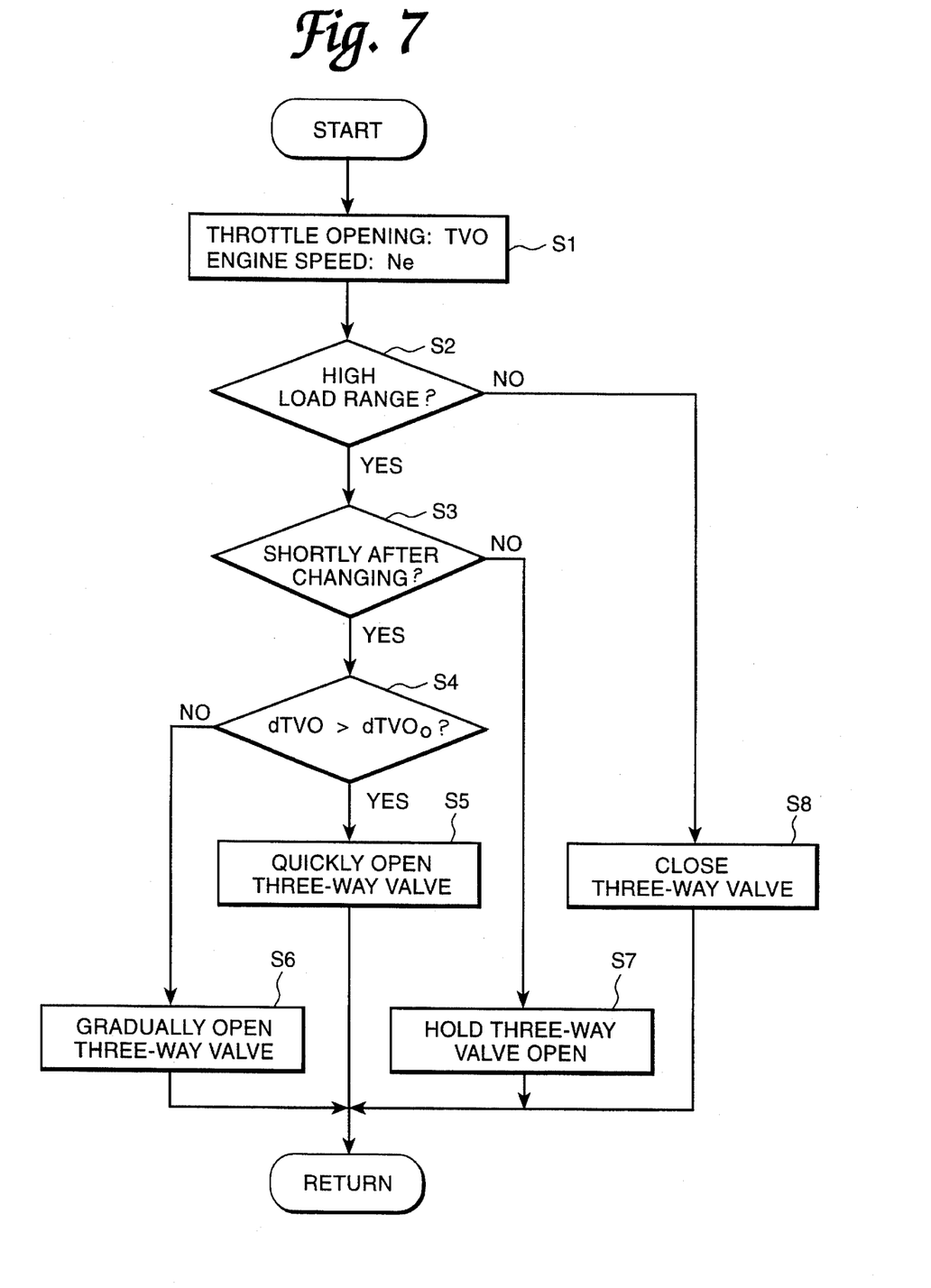
FIG. 7 is a flow chart illustrating a three-way valve duty control sequential routine for an ECU.

The operation of the air intake system depicted in FIG. 1, in which the electromagnetic three-way valve 27 is duty controlled, is clearly understood by reviewing FIG. 7, which is a flow chart illustrating a three-way valve duty control sequential routine for the ECU 55. Programming a computer is a skill well understood in the art. The following description is written to enable a programmer having ordinary skill in the art to prepare an appropriate program for the ECU 55. The particular details of any such program would, of course depend upon the architecture of the particular computer selected.

Referring to FIG. 7, the first step S1 is to read signals from the throttle opening sensor 56 and the engine speed sensors 57, which are, respectively, representative of an engine speed Ne and an throttle opening TVO, and detect a current engine operating condition. Then, a decision is made at step S2 whether or not the current engine operating condition is within the high load range of engine operating conditions defined above the critical torque line $T_p$ shown in FIG. 6. This decision is made to find whether the electromagnetic three-way valve 27 must be turned on or off. If the answer to the decision made at step S2 is "YES," then a decision is made at step S3 whether or not it is shortly after changing of engine operating condition into the high load range. If the answer to the decision made at step S3 is "YES," this indicates that the current engine operating condition is immediately after changing into the high load range, then, another decision is made at step S4 whether or not the changing rate of throttle valve opening dTVO is higher than a critical rate $dTVO_o$. If the answer to the decision is "YES," this indicates that the engine operating condition has changed rapidly, i.e. a rapid acceleration is made. Then the ECU 55 changes the duty rate of a control signal so as to rapidly turn on the electromagnetic three-way valve 27 at step S5. However, if the answer to the decision is "NO" this indicates that the engine operating condition has changed gradually, i.e. a gentle acceleration is made. Then the ECU 55 changes gradually the duty rate of a control signal so as to gently turn on the electromagnetic three-way valve 27 at step S6.

Thereafter, if the engine operating condition is held within the high load range after the electromagnetic three-way valve 27 has turned on, and the answer to the decision made at step S3 is "NO" the ECU 55 holds a control signal so as to hold the electromagnetic three-way valve 27 turned on at step S7. However, if the engine operating condition changes into the low load range below the critical torque line $T_p$ after the electromagnetic three-way valve 27 has turned on, then, the answer to the decision made at step S2 is "NO," and the ECU 55 turns off the electromagnetic three-way valve 27 at step S8.

In this embodiment, when the engine operating condition enters into the high load range of engine operating conditions in which the boost pressure is higher than the critical boost pressure $P_b$ or which is defined above the critical torque line $T_p$, the electromagnetic three-way valve 27 is forcibly energized or turned on. As a result, a negative pressure is introduced into the secondary pressure chamber 24 of the actuator 20, so as to forcibly entirely close the recirculation control valve 15, thereby preventing the recirculation of air discharged from the supercharger 4, accompanied by an increase in pressure of supercharging air. This satisfies the demand of engine output performance at the full throttle or in the high load range of throttle openings near the full throttle. During opening of the throttle valve at a high changing rate, such as a rapid acceleration, the recirculation control valve 15 is rapidly brought into its entirely closed position, so as to provide an increase in pressure of supercharging air with a high responsiveness. On the other hand, during such an ordinary engine operation that the throttle valve opens at a low changing rate, the recirculation control valve 15 is gradually closed, so as to avoid rapid changes in engine output torque.

It is to be understood that the decision of engine operating condition made at step S2 may be made based on the temperature of intake air in the surge tank 8 and the amount of intake air into the intake passage 3 upstream from the supercharger 4, in place of the opening of throttle valve and the speed of rotation of engine. The temperature of intake air in the surge tank 8 and the amount of intake air may be detected by sensors, such as a temperature sensor and an air flow meter, which are well known in the art and may take any well known form. In this instance, a pressure in the intake passage 3 downstream from the supercharger 4 is calculated based on the temperature of intake air in the surge tank 8 and the amount of intake air and is compared with the critical boost pressure $P_b$. It is also to be understood that, in place of a slight clearance between the valve body 17 and the valve seat 15a until the boost pressure reaches the critical pressure $P_b$, a small passage and a valve for opening and closing the small passage may be provided between the recirculation passage 11 upstream the recirculation control valve 15 and the interior of the recirculation control valve 15.

The intake system of the present invention has a variety of applications of engine output control in addition to the engine output control according to changes in engine operating condition. For example, for engines in which both regular gasoline and high octane gasoline can be used, the electromagnetic three-way valve 27 is controlled as described above for high octane gasoline only. However, if regular gasoline is used, the electromagnetic three-way valve 27 may be deenergized or turned off and held deenergized even in the high load range of engine operating condition in which engine knocking is apt to occur. Furthermore, if the air intake system of the present invention is installed in cars provided with automatic transmissions, in order for the automatic transmission to assure the reliability of gears, the recirculation control valve 15 and the relief valve 39 may be controlled so as to provide a drop in engine output torque while the automatic transmission is in a reverse range and a first range. In this instance, in the first range, the electromagnetic three-way valve 27 is held deenergized or turned off so as to prevent the recirculation control valve 15 from being entirely closed and the electromagnetic three-way valve 45 is energized or turned on so as to open the relief valve 39. On the other hand, in the reverse range, the relief valve 39 is opened, or otherwise the recirculation control valve 15 is prevented from being entirely closed while the relief valve 39 is opened.

In order to prevent excessive high speeds, the electromagnetic three-way valve 45 may be energized or turned on so as to open the relief valve 39 when the vehicle reaches a specified upper limit speed, thereby causing a drop in engine output torque. Furthermore, the relief valve 39 may be opened when there is an unusual increase in temperature of intake air downstream from the supercharger 4 and/or from the intercooler 7.

It is also to be understood that although the present invention has been described in detail with respect to a preferred embodiment thereof, various other embodiments and variants may occur to those skilled in the art. Such other embodiments and variants fall within the scope and spirit of the invention and are intended to be covered by the following claims.

What is claimed is:

1. An intake system for a supercharged internal combustion engine of an automobile having an intercooler disposed in an intake passage downstream from a supercharger, a recirculation passage for communicating portions of said intake passage upstream and downstream from said supercharger through which air discharged from said supercharger is recirculated to said supercharger, and recirculation valve means, disposed in said recirculation passage, for opening and closing said recirculation passage, said intake system comprising:

a bypass passage for communicating portions of said intake passage upstream and downstream from said intercooler so as to allow said air to bypass said intercooler;

bypass control valve means, disposed in said bypass passage, for opening and closing said bypass passage;

recirculation valve control means, provided in association with said recirculation valve means, for, as said air changes between a low specified pressure, below atmospheric pressure, and a high specific pressure, above atmospheric pressure, causing said recirculation valve means to increasingly open said recirculation passage gradually with a decrease in pressure of said air and decreasingly close said recirculation passage gradually with an increase in pressure of said air; and bypass valve control means, provided in association with said bypass control valve means, for causing said bypass valve means to open and close at an interim specified pressure of said air between said high and low specified pressures so that said bypass control valve means opens when said air is below said interim specified pressure and closes when said air is above said interim specified pressure;

said recirculation valve control means comprising a pressure operated actuator which causes said recirculation valve means to open and close said recirculation passage in accordance with differences between the atmospheric pressure and an intake air pressure upstream of said supercharger; and said pressure operated actuator comprising a valve housing in which said recirculation valve means slides, a diaphragm connected to said recirculation valve means, a diaphragm housing in which said diaphragm is slidable and which is divided into two pressure chambers by said diaphragm, and pressure guide means for introducing intake air upstream of said supercharger into said valve housing so as to apply said intake air to said recirculation valve means in one direction opposite to another direction in which said air acts on said recirculation valve means, introducing said air into one of said two pressure chambers so as to apply said air to said diaphragm in said one direction, and introducing the atmospheric pressure into another one of said two pressure chambers so as to apply the atmospheric pressure to said diaphragm in said other direction.

2. An intake system as defined in claim 1, wherein said pressure operated actuator further comprises a negative pressure source for generating a negative pressure and an electromagnetic valve for introducing the negative pressure from said negative pressure source into said other one of said two pressure chambers so as to cause said recirculation valve means to entirely close said recirculation passage at said high specified pressure.

3. An intake system for a supercharged internal combustion engine of an automobile having a supercharger disposed in an intake passage, and a recirculation passage for communicating portions of said intake passage upstream of and downstream from said supercharger through which air discharged from said supercharger is recirculated to said supercharger, said intake system comprising:

recirculation valve means, disposed in said recirculation passage, for opening and closing said recirculation passage; and recirculation valve control means, provided in association with said recirculation valve means, for, as air downstream from said supercharger decreases toward a low specified pressure, causing said recirculation valve means to open said recirculation passage, for, as said air downstream from said supercharger increases toward a high specified pressure, causing said recirculation valve means to gradually close said recirculation passage so as to leave a small clearance which allows recirculation of a small amount of air downstream from said supercharger at said high specified pressure of said air, and for causing said recirculation valve means to close completely said recirculation passage at pressures higher than said high specified pressure of said air;

said recirculation valve control means further detecting rapidness of a rate of change in opening of a throttle valve disposed in said intake passage upstream of said supercharger, rapidly causing complete closing of said recirculation passage by said recirculation valve means when detecting a high rate of change in said opening and gradually causing said complete closing of said recirculation passage by said recirculation valve means when detecting a gradual rate of change in said opening.

4. An intake system for a supercharged internal combustion engine of an automobile having a supercharger disposed in an intake passage, and a recirculation passage for communicating portions of said intake passage upstream of and downstream from said supercharger through which air discharged from said supercharger is recirculated to said supercharger, said intake system comprising:

recirculation valve means, disposed in said recirculation passage, for opening and closing said recirculation passage; and recirculation valve control means, provided in association with said recirculation valve means, for, as air downstream from said supercharger decreases toward a low specified pressure, causing said recirculation valve means to open said recirculation passage, for, as said air downstream from said supercharger increases toward a high specified pressure, causing said recirculation valve means to gradually close said recirculation passage so as to leave a small clearance which allows recirculation of a small amount of air downstream from said supercharger at said high specified pressure of said air, and for causing said recirculation valve means to close completely said recirculation passage at pressures higher than said high specified pressure of said air;

said recirculation valve control means including a pressure operated actuator comprising a valve housing in which said recirculation valve means slides, a diaphragm connected to said recirculation valve means, a diaphragm housing in which said diaphragm is slidable and which is divided into two pressure chambers by said diaphragm, and pressure guide means for introducing intake air upstream of said supercharger into said valve housing so as to apply said intake air to said recirculation valve means in one direction opposite to another direction in which said air acts on said recirculation valve means, introducing said air into one of said two pressure chambers so as to apply said air to said diaphragm in said one direction, and introducing the atmospheric pressure into another one of said two pressure chambers so as to apply the atmospheric pressure to said diaphragm in said other direction.

5. An intake system as defined in claim 4, wherein said pressure operated actuator further comprises a negative pressure source for generating a negative pressure, and an electromagnetic valve for introducing a negative pressure from said negative pressure source into said other one of said pressure chambers so as to cause said recirculation valve means to entirely close said recirculation passage at said high specified pressure.

6. An intake system as defined in claim 5, wherein said recirculation valve control means controls a duty rate of said electromagnetic valve so as to cause a rapid introduction of a negative pressure into said other one of said pressure chambers when detecting a rapid rate of change in opening of a throttle valve disposed in said intake passage Upstream of said supercharger, and to cause a gradual introduction of a negative pressure into said other of said pressure chambers when detecting a gradual rate of change in opening of said throttle valve.

* * * * *